R. H. MATHIES.
Water Gage.
No. 24,519.
Patented June 21, 1859.
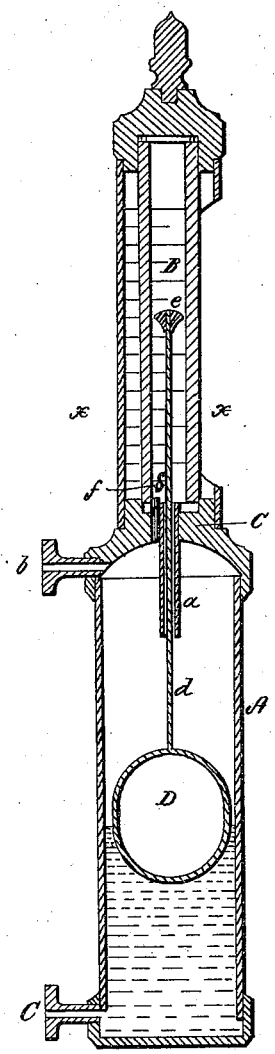
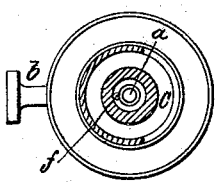
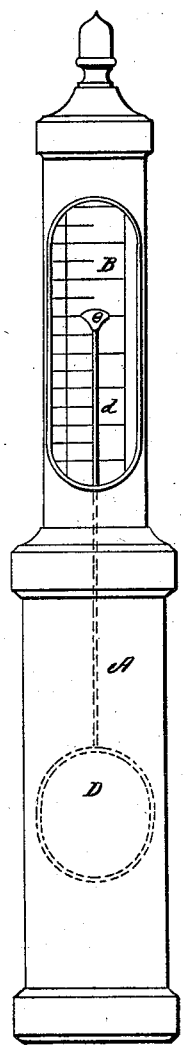
Witnesses:
J. A. Minott.
Geo. Pitt Smith.
Inventor:
R. H. Mathies
by A. Black his Atty.

UNITED STATES PATENT OFFICE.

ROBERT H. MATHIES, OF BOSTON, MASSACHUSETTS, ASSIGNOR TO A. N. CLARK, OF BEVERLY, MASSACHUSETTS.

WATER-GAGE FOR STEAM-BOILERS.

Specification of Letters Patent No. 24,519, dated June 21, 1859.

*To all whom it may concern:*

Be it known that I, ROBERT H. MATHIES, of Boston, in the county of Suffolk and State of Massachusetts, have invented a new and useful Improvement in Water-Gages for Steam-Boilers; and I do hereby declare that the following is a clear and exact description thereof, reference being had to the accompanying drawing, which forms part of this specification, and in which—

Figure 1 represents a side view in section of a water gage constructed according to my improvement; Fig. 2, a front elevation thereof and Fig. 3 a horizontal section taken as denoted by the line *x x* in Fig. 1.

The description of water gage to which my improvement relates may be briefly described as follows: A metal tube, occupying a vertical position, is arranged on the outside of the boiler, at an altitude reaching from a little below to a little above the ordinary or proper water level in the boiler. This tube is closed at the bottom and connected by two branch pipes with the boiler, the one of said pipes establishing a free communication of the lower portion of said tube with the water space in the boiler, and the other of said pipes connecting the upper portion of the tube with the steam space in the boiler. The top of this metal tube is closed by and has mounted on it a glass hollow index or tube hermetically sealed at the top and forming, as it were, an uninterrupted continuation of the steam space in the metal tube, by means of a large central opening uniting the two tubes. This large central opening between the two tubes serves alike for the passage of steam to the glass tube, for the water condensed from the steam in the glass tube to descend into the water space of the metal tube below, and for the play or free rise and fall of a vertical central rod, which is attached at its lower end to a float that rests on the water in the metal tube. This rod carries a pointer at its upper end to denote on the hollow index or glass tube the changes in the water level of the boiler. Such construction of a water-gage is in some respects objectionable. The large central opening between the glass and metal tubes, and necessarily large from the three purposes to which it is applied, causes the hollow glass index or tube to become so hot, when steam of a high temperature is generated in the boiler, and subjects said tube to such sudden and great variations of temperature by abrupt changes in the pressure or consumption of steam in the boiler, that said tube is very liable to fracture from the well known unfitness of glass to withstand such shocks or actions. To make the glass tube of an increased thickness will only partially obviate such liability to breakage from these causes, while the sight of the interior pointer is impeded and its true position less clearly ascertained by using glass of an excessive thickness. Such construction of the gage also has another defect. Should the water in the boiler reach an unusually high level, the float in the gage will rise so as to make it choke or close, as a valve, the large central communication between the two tubes and thus stop the free passage of steam to the hollow glass index or tube. To obviate this defect and to produce a gage that shall be more perfect in its action generally are the objects of my improvement. Those acquainted with the inconvenience and danger by the escape of steam, attending the breaking of the glass index or tube in such gages, will readily perceive the advantage of any arrangement which has for one of its objects the reduction of the liability to breakage of said tube, and such saving effect it will be seen from the following description my invention possesses.

Referring to the accompanying drawing, I divide the metal tube (A) and hollow glass index or tube (B) by a partition (C). This partition is designed to virtually separate the two tubes, between which I establish a more or less central communication by means of a tube (*a*) arranged to project some distance below the partition or below the line of steam ingress of the steam pipe (*b*) which connects the water gage with the steam space of the boiler, as a lower pipe (*c*) connects said gage with the water space of the boiler. The interior tube (*a*) is of small area only in its cross section sufficient to receive within and up through it, in a free manner, the rod (*d*) of the float (D) and to leave a small annular space around said rod within the tube for the passage of condensed steam or water from the upper tube (B) to the lower tube (A). The rod (*d*) carries a pointer (*e*) and serves to indicate within the glass tube the changes in the level of the water in the boiler by the rise and fall of the float (D) as in other gages to which I have referred. The gage partition (C) is further and separately provided with a small steam tube or passage (f) connecting the metal and glass tubes (A) (B) of the gage. This additional connecting tube (f) I prefer to arrange near to the steam inlet pipe (b) and to cause it to project a short distance above the partition (C) to secure the more perfect action of said tube as a steam way free from the water of condensation in the upper tube; but changes in these minor respects as also in the position of the water course (a) may be made without destroying the character of my improvement.

From this description it will appear that, supposing steam to have been generated and in course of generation by the boiler, the water which forms in the glass tube (B) by condensation of the steam on its sides will trickle down said tube and find its way to the interior central tube (a) and pass down within and through the annular space in said tube surrounding the float rod. Under certain conditions of exposure of the gage to extreme cold it is easy to imagine that said central interior tube would thus be kept full of condensed steam or water passing from the upper to the lower main tubes of the gage, and the flow of steam up said central tube be wholly or mainly stopped. But it is a matter of no moment whether the small annular space left for the passage of condensed steam in the interior central tube, be filled or only partially filled with water, it will always preserve its character as a water course in contradistinction to a steam way. Thus the steam entering by the pipe (b) naturally takes the readiest and most free passage to the upper main or glass tube (B) of the gage, in the constant effort that is being made to establish an equilibrium above and below the partition that separates the main tubes, and which equilibrium is disturbed by the condensation that takes place in the glass tube. This readiest and freest passage for the steam to the glass tube is found in the small steamway (f) that is kept free by the steam blowing through it, and the steam entering through which serves to add to the pressure in the glass tube to assist in passing the water of condensation down the central tube (a). These actions are intermittent or constant according to circumstances of work and exposure.

As compared with the ordinary construction of gage, wherein one large central opening or thorough communication between the upper and lower main tubes is used, and the water and steam courses between said tubes are not divided, a much more perfect action takes place under this my improvement.

The partition (C) with its small tubes (a and f) protects the glass tube from that extreme heat and abrupt change of temperature which is consequent upon a large unbroken opening between the main tubes and which is often so fatal to the upper or glass tube. By this my improvement the glass tube is kept cooler and its capacity to condense the steam increased and said tube better protected against the effects of sudden changes of temperature, alike, by reason of the partition dividing the two tubes as well as by the gradual manner in which steam passes from the one to the other apart from the water of condensation. Also, by this my improvement should the water in the boiler rise so as to cause the float (D) to close the central opening between the upper and lower main tubes, the passage of steam to the glass tube will not be cut off or interfered with.

Having thus fully described my improvement in water gages what I here claim as my invention is—

The combination with the partition that separates the upper and lower main tubes of the gage, of the independent steam and water tubes or courses arranged to unite the spaces in the main tubes substantially as specified and for the purposes set forth.

In testimony whereof I have signed my name to this specification before two subscribing witnesses.

R. H. MATHIES.

Witnesses:
Jas. B. Robb,
Thomas Davies.